United States Patent
Miyakoshi et al.

(10) Patent No.: US 7,466,488 B2
(45) Date of Patent: Dec. 16, 2008

(54) OPTICAL ELEMENT PRODUCING METHOD AND OPTICAL ELEMENT

(75) Inventors: Hiroshi Miyakoshi, Hachioji (JP); Kazumi Furuta, Akishima (JP); Masahiro Morikawa, Hachioji (JP); Osamu Masuda, Machida (JP); Makiko Imae, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 183 days.

(21) Appl. No.: 11/173,422

(22) Filed: Jul. 1, 2005

(65) Prior Publication Data
US 2006/0077557 A1     Apr. 13, 2006

(30) Foreign Application Priority Data
Jul. 9, 2004   (JP) .............................. 2004-203054

(51) Int. Cl.
G02B 27/14   (2006.01)
(52) U.S. Cl. ...................... 359/634; 359/279
(58) Field of Classification Search ................. 359/563, 359/566, 569, 621, 622, 634, 237, 379
See application file for complete search history.

(56) References Cited

U.S. PATENT DOCUMENTS

| | | | | |
|---|---|---|---|---|
| 4,729,640 A | * | 3/1988 | Sakata | 349/201 |
| 4,729,641 A | * | 3/1988 | Matsuoka et al. | 349/200 |
| 6,618,116 B1 | * | 9/2003 | Murata et al. | 349/201 |

FOREIGN PATENT DOCUMENTS

| | | |
|---|---|---|
| JP | 61-155801 U | 9/1986 |
| JP | 2002-220241 | 8/2002 |

* cited by examiner

*Primary Examiner*—Joseph Martinez
(74) *Attorney, Agent, or Firm*—Frishauf, Holtz, Goodman & Chick, P.C.

(57) ABSTRACT

A producing method of an optical element such as quarter-wave plate wherein preparing a first member which has a coefficient of elasticity of 1-4 (GPa) at normal temperature, setting the temperature of a die having microscopic shape with high aspect ratio to be higher than the glass transition temperature of the first member and pressing the die against the first member to transfer a microscopic shape on the first member, a microstructure is formed on the first member. In the same manner, a second microstructure is formed on a second member. Afterwards, by connecting the first member and the second member, an optical element in which the first member and the second member are connected having microstructures with high aspect ratio face each other, is obtained.

12 Claims, 10 Drawing Sheets

OPTICAL ELEMENT PRODUCING METHOD AND OPTICAL ELEMENT

BACKGROUND OF THE INVENTION

1. Field of the Invention

The present invention related to optical elements and its producing method and in particular, related to optical elements having a microstructure with extraordinary high aspect ratio and preferable producing method of it.

2. Description of Related Art

In the recent years, in optical pick up device field developing rapidly, optical elements such as extra high accurate objective lenses are utilized. Molding the materials like plastic and glass into such optical elements by metal die, uniform products in its configuration can be made rapidly therefore, such metal molding are regarded to be suitable for mass production of such optical elements.

Also, as recent pick up devices, the devices capable of conducting recording and/or reproducing high density information on HD DVD (High Definition DVD) and BD (Blue-ray Disc) using beam from shorter wave semiconductor laser are being developed. To improve the aberration of optical system, optical elements with various ideas are provided. Though such optical pick up devices capable of conducting recording and/or reproducing of high density information, it is needed to maintain the ability of conducting recording and/or reproducing for existing CDs and DVDs that have been supplied in large quantity so far. In such optical pick up devices capable of conducting recording and/or reproducing compatibly, there is sometimes used a wave plate giving a phase difference to make optical systems common.

Japanese Published Utility Model Application Jitsukaisho 61-155801 (JP61-155801U), discloses that an ordinary wave plate is made by grinding expensive material such as crystal. Further, it discloses that a method using a grid is suggested in addition to the crystal grinding method, because high density surface relief grating shows the character of birefringence, thus it is known as a type of wave plate having so-called microstructure.

Structural birefringence means birefringence generated by the directional properties of microstructure. For instance, micro period structure (so-called line and space structure) in which flat plates having no birefringence with different refractive index are laid in parallel within a period smaller enough ($<\lambda/2$) than wavelength $\lambda$ of light is known to generate birefringence (Refer to Principle of Optics, Max Born and Emil Wolf, PERGAMON PRESS LTD.).

Refractive index $n_p$ of light whose direction of polarization is parallel to the groove and refractive index $n_v$ of light whose direction of polarization is perpendicular to the groove are as follows respectively:

$$n_p = (tn_1^2 + (1-t)n_2^2)^{1/2} \quad (1)$$

$$n_v = 1/(t/n_1^2 + (1-t)/n_2^2)^{1/2} \quad (2)$$

$n_1$ and $n_2$ are a refractive index of substance (line) in which microstructure is molded and a refractive index of substance (space) respectively. Also t is duty rate of micro period structure and is:

$$t = w_1/(w_1 + w_2) \quad (3)$$

meanwhile, $w_1$ and $w_2$ are the width of substance(line) constructing micro period structure and the width of substance (space) filling the groove respectively. While the birefringence contained in crystal and calcite is indigenous to the substances and cannot be changed, the birefringence of micro period structure can be controlled easily by altering the material or the shape of it. Also, the phase difference (retard amount) Re between a light having direction of polarization parallel to the groove and a light having direction of polarization perpendicular to the groove will be:

$$Re = (n_p - n_v)d \quad (4)$$

provided that the height (depth of the groove) of birefringence of micro period structure is d.

According to these formulas, the phase difference (retard amount) Re can be changed by making the duty rate t of the birefringence of micro period structure and the height of birefringence (the depth of groove) d variable.

Therefore, for instance, when a quarter-wave plate for 400 nm laser beam is needed to be formed as a optical element, using plastic material having an refractive index of around 1.5 at an ordinary temperature, if the widths of line and space are 100 nm and 90 nm respectively, the height of structure d has to be 1200 nm. In this case, since the aspect ratio will be around 12, such microstructure is difficult to form.

Figure 1A:
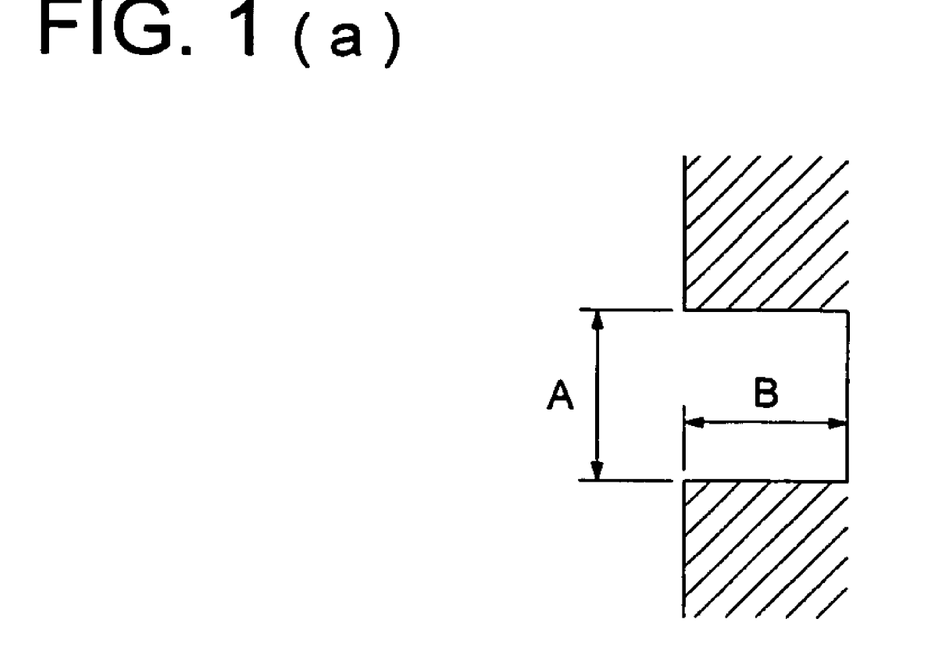
FIG. 1(a) and FIG. 1(b) are to explain the aspect ratio.
Figure 1B:
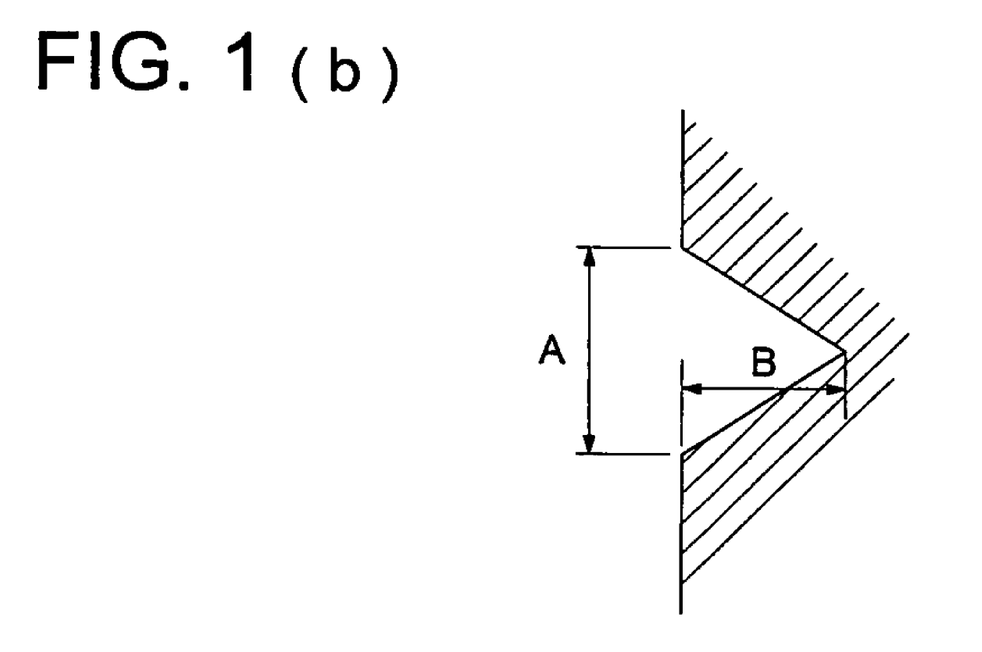

AS FIG. 1(a) and FIG. 1(b) show, "Aspect Ratio" is the value indicated by B/A provided that the width of convex or concave is represented by A and the depth or the height is represented by B in the microstructure. "Microscopic shape" means the form in which the value A is not more than 10 μm.

Contrarily, as the optical element disclosed in JP61-155801U, it is considered that it is possible to give a phase difference of ¼ by forming microstructures with half aspect ratio on each of the plane of incident side and the plane of emergency side so that a ray transmits these two microstructures. However JP61-155801U discloses that microstructures are made on the plane of incident side and the plane of emergency side by pressing single bulk material however, the specific method to make the optical elements is not clarified. In particular, it is considerably difficult to form microstructures in two directions on single bulk material.

The wave plate having microstructure mentioned above has line and space structures which line up within a period of not more than ½ wavelength of the light which is passing through the wave plate. Therefore, the problem is that, in ordinary injection molding, the materials are difficult to go into each steps of a microscopic shape made on the die, simply by injecting the melting plastic, thus the transferring of microscopic shape cannot be done accurately. If the microstructure cannot be formed as planned, because of poor transferring quality (due to dull material), the optical character will be deteriorated and the optical pick up device with such optical element may cause recording errors. Therefore, though various ideas had been tried, it is difficult to eliminate the dullness completely in the conventional method.

On the other hand, Unexamined Japanese Patent Application No. 2002-220241 (JP2002-220241A) discloses the method to form optical element having micro pattern on its surface by pressing glass material while it is softened by heat.

However, forming microstructure with the aspect ratio of around 0.2 wherein the width is approx. 10-50 MM and the height is approx. 20-10 MM, on the glass surface is the utmost the art described in JP2002-220241A can do. This is because the coefficient of elasticity of inorganic glass is as high as 70 GPA at ordinary temperature, and therefore the glass material doesn't go deep into of microstructure smoothly, even if the glass surface is pressed by heated die with extremely high pressure of 3000N, resulting in the utmost of forming microstructure with aspect ratio of 0.2. Therefore, the molded products having microstructure with aspect ratio of not less than 1 may exist as prototypes however, industrial products with uniformity in their shapes do not exist yet.

Meanwhile, JP61-155801U discloses an optical element having microstructures on its plane of incident side and plane of emergency side however, how the microstructure with high aspect ratio is formed is not clarified specifically and only description says that a stamper is used to press both surfaces of acryl board with heated die to form the microstructure.

The optical element described in JP61-155801U has a problem that is that foreign matters such as dust, water and oil can easily adhere to microstructure, because microstructures are formed on each of plane of incident and plane of emergency of optical element and in particular, liquid can easily go deep inside by a capillary phenomenon and is difficult to remove. Also another problem is that microstructure with high aspect ratio can easily be damaged by external force.

SUMMARY OF THE INVENTION

This invention has been accomplished considering the technical issues of prior art. An object of the invention is to provide a producing method which can produce, more simply and at low cost, superior optical elements which have microstructure with high aspect ratio and are excellent in handling. Another object of the invention is to provide optical elements. The aforesaid objects can be achieved by providing the following producing method and optical element.

A producing method of an optical element comprising the steps of: preparing a first member having an coefficient of elasticity of 1-4 (GPa) at an ordinary temperature, setting the temperature of a die with microscopic shape higher than the glass transition temperature of the first member, pressing the die against the first member in order to form first microstructure on the first member by transferring the microscopic shape onto the first member, releasing the die from the first member, preparing a second member with coefficient of elasticity of 1-4 (GPa) at an ordinary temperature, a step to set the temperature of the die with microscopic shape higher than the glass transition temperature of the second member, pressing the die against the second member in order to form a second microstructure on the second member by transferring the microscopic shape onto the second member, releasing the die from the second member and connecting the first member having the first microstructure and the second member having the second microstructure.

An optical element of the second invention is characterized in that a first member having first microstructure with aspect ratio of not less than 1 at a period of at least not more than the wavelength of the light passing through the optical element and a second member having second microstructure with aspect ratio of not less than 1 at a period of at lease not more than the wavelength of the light passing through the optical element are connected each other so that first microstructure and second microstructure face each other.

DETAILED DESCRIPTION OF THE PERFERRED EMBODIMENTS

The present embodiment of the invention is described specifically as follows.

The inventors created a method to produce optical elements each having a microstructure, from the totally different aspects from prior art, as a result of intensive study.

That is, in the case of plastic material having the coefficient of elasticity of 1-4 (GPa) at an ordinary temperature, they found out that when a heated die having microscopic shape is pressed against the surface of the member, the surface pressed melts and follows the microscopic shape, consequently, even if the.aspect ratio is not less than 1, the molded products in which the microscopic shape is accurately transferred can be obtained.

Meanwhile, the member with the coefficient of elasticity of 1-4 (GPa) are the member containing resins with the coefficient of elasticity of 1-4 (GPa) as the components, such as, for example PMMA (Polymethylmethacrylate). (Coefficient of elasticity: 1.5-3.3 GPa), Polycarbonate (Coefficient of elasticity: 3.1 GPa), Polyolefin (Coefficient of elasticity: 2.5-3.1 Gpa). Hereby ordinary temperature means 25° C. The glass transition temperature of these resins is preferred to be 50-200° C. The coefficient of elasticity can be obtained in accordance with the method in Japan Industrial Standard JIS-K7161, 7162 and so forth. Glass transition temperature. can be measured by the method stated in JIS R3102-3:2001.

Figure 2A:
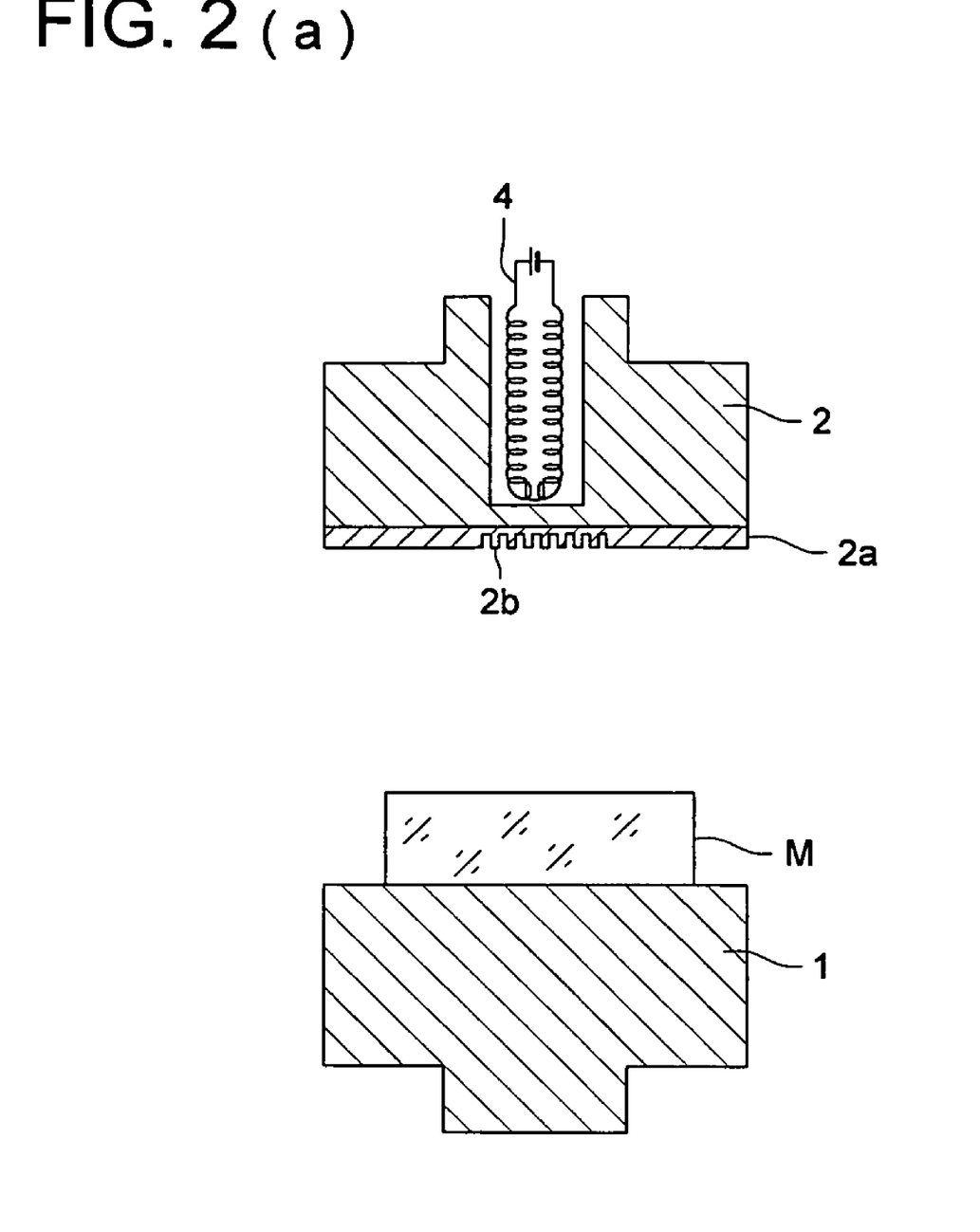
FIG. 2(a), FIG. 2(b) and FIG. 2(c) are diagrams showing, production procedures for optical elements with which the producing method related to the present embodiment can be practiced.
Figure 2B:
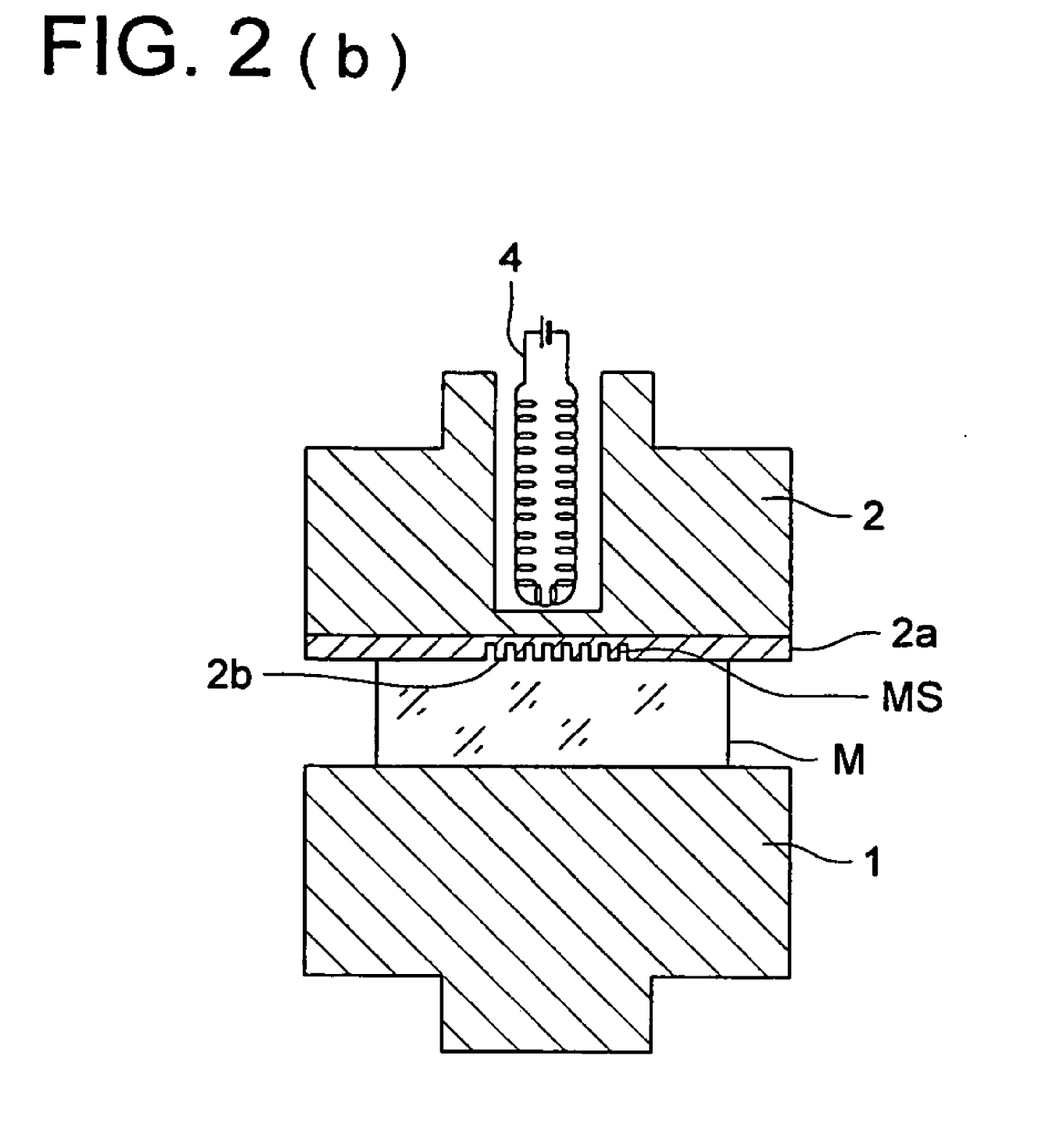
Figure 2C:
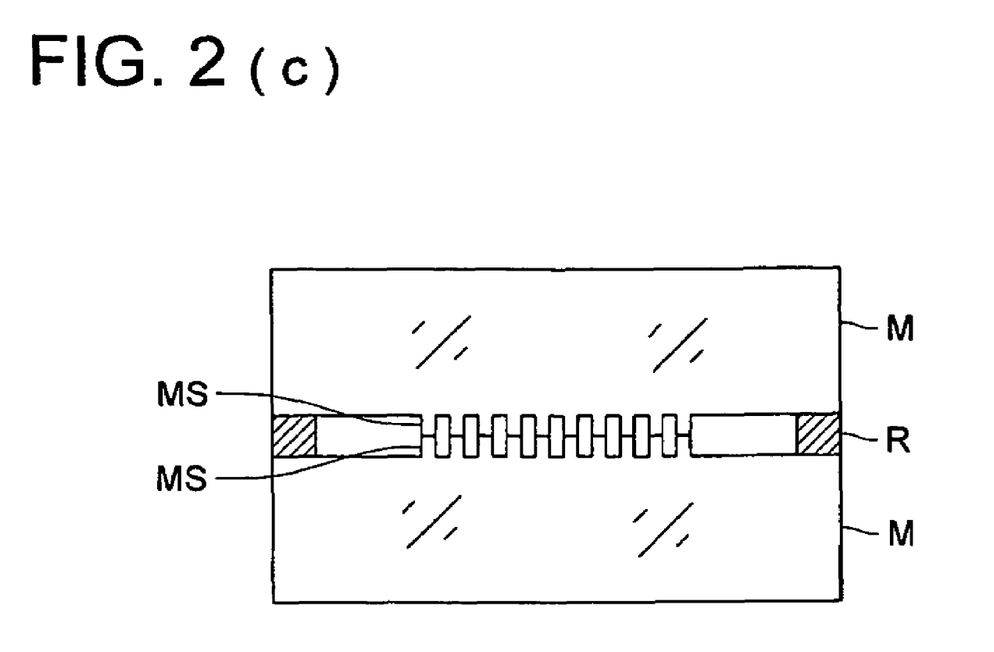

A present embodiment of the invention will be explained as follow, referring to the drawings. Each of FIGS. 2(a), 2(b) and 2(c) is a schematic diagram showing the out line of the producing process of the optical element related to this preferred embodiment of the invention. In each of FIGS. 2(a) and 2(b), above a lower die 1, that is made of SUS 304 and is fixed on an unillustrated frame, an upper die 2 made of SUS304 is located movably on a relative movement basis against the lower die 1. The lower die 1, as a retainer, can retain first member or second member M on its upper surface.

On the lower surface of the upper die 2, a disk die 2a made of silicon is fixed. On the lower surface of the disk die 2a, there is formed a microscopic shape 2b with aspect ratio of not less than 1 by electron beam writing which microscopic shape 2b is to be utilized, for example for a wave plate. In the present embodiment of the invention, a material of each of the first member and the second member is preferably PMMA (Molecular weight: 70 thousands, Glass transition temperature Tg: 100° C., Coefficient of elasticity: 3.3 GPa). Without being limited to the above materials, acrylic resins and polycarbonate can also be used. The upper die 2 and the disk die 2a form a die. Meanwhile, though it is not illustrated, a driving system is provided to move the upper die 2 in the direction to approach, or the direction to leave the lower die 1.

Figure 3:
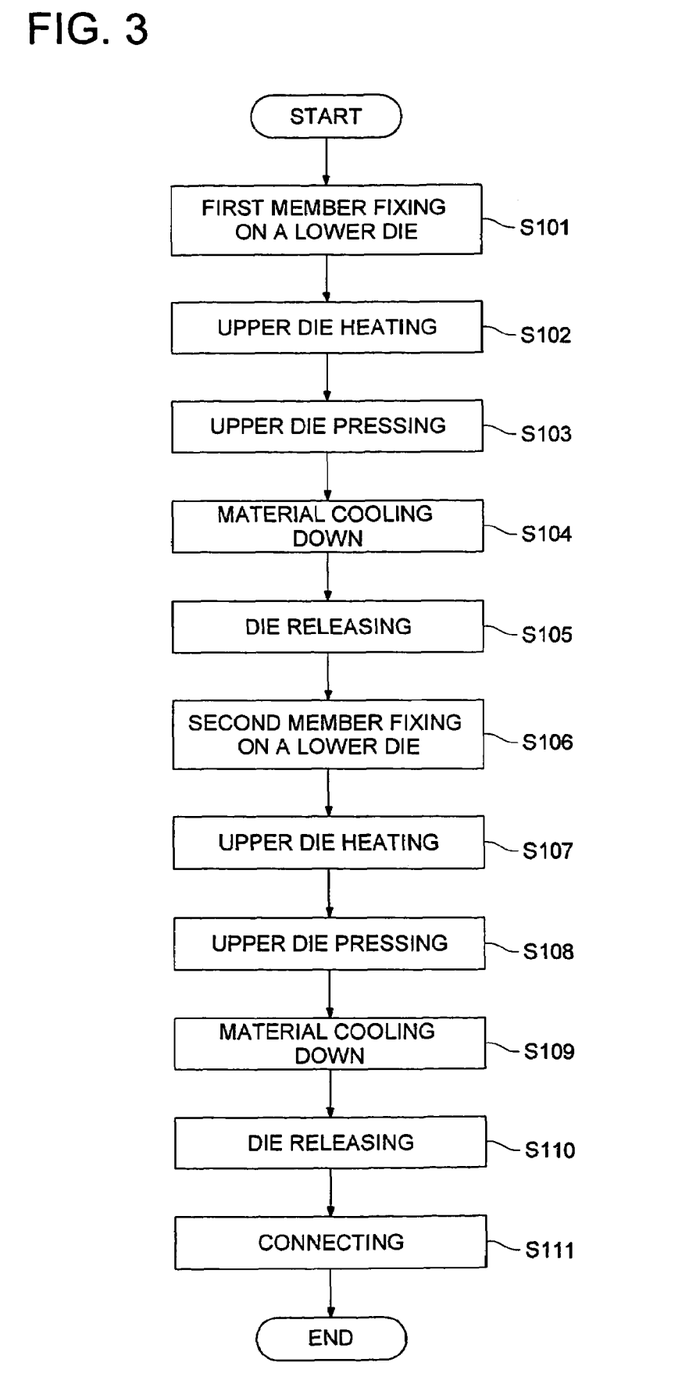
FIG. 3 is a flow chart showing a producing method of the present embodiment of the invention.

FIG. 3 is a flow chart showing a producing method of the present embodiment of the invention. Referring to FIG. 3, the producing method stated above is explained. In the step S101, as FIG. 2(a) shows, first member M (Coefficient of elasticity is preferably 1-4 (GPa) at an ordinary temperature) is fixed on the upper surface of the lower die 1 opened (The step to fix first member on the retainer). Then, in step S102, heater 4 is operated to generate heat to heat upper die 2 so as to become a higher temperature than the glass transition temperature Tg (hereinafter called transfer temperature) (The step of setting the temperature of the die to be higher than the glass transition temperature of the fist member).

And then, after lower surface of the disk die 2a is heated to be higher than glass transition temperature Tg, an unillustrated drive mechanism is driven to press the first member M with the upper die 2 (Step S103), as FIG. 2(b) shows. Then the upper surface of the first member M is rapidly heated up to be higher than the glass transition temperature to melt and a microscopic shape 2b of disk die 2a is transferred onto its surface, and a first microstructure MS is formed (The step of pressing the die against the first member to transfer the first microstructure).

For the next, in the step S104, the heater 4 is turned off to cool upper die 2 down naturally in order to lower the surface temperature of the first member M to be not more than said transfer temperature. Forced cooling is also accepted.

After this, in Step S105, the upper die 2 is removed and the first member M is removed from the lower die 1 for releasing. (Step of releasing).

For the next, as FIG. 2(a) shows in step S106, a second member M (preferably coefficient of elasticity at an ordinary temperature is 1-4 GPa) is fixed on the upper surface of the lower die 1 opened (The step to fix second member on the retainer). Then in Step S107, the heater 4 is turned on to heat upper die 2 so as to become a higher temperature than the glass transition temperature Tg (hereinafter called transfer temperature) (The step to set die temperature to be higher than glass transition temperature of second member).

And then, after the lower surface of disk die 2a is heated to be not less than the glass transition temperature Tg, an unillustrated drive mechanism is driven to press the second member M with the upper die 2 as FIG. 2(b) shows (Step S108). Then the upper surface of second member M is rapidly heated up to be not less than the glass transition temperature to melt and a microscopic shape 2b of disk die 2a is transferred onto its surface, and a second microstructure MS is formed (The step of pressing the die against the second member to transfer the second microstructure).

For the next, in the step S109, the heater 4 is turned off to cool the upper die 2 down naturally in order to lower the surface temperature of the second member to be lower than said transfer temperature. Forced cooling is also accepted.

After this, in Step S110, the upper die 2 is removed and the second member M is removed from the lower die 1 to release die (The step of releasing).

Then, in Step S111, as FIG. 2(c) shows, the first material M wherein the microstructure is formed and the second material M wherein the microstructure is formed are connected so that the microstructures may face each other, with a ring member R (a third member) lying between the first member and the second member (Step of connecting). By this connecting, the space containing microstructures facing each other becomes airtight. The connecting can be done by applying adhesive between the ring member R and each of the first member M and the second member M or can be done by welding. Also an adhesive tape can be used for sticking and an adhesive tape can be used as the third member. In this procedure, microstructure MS on first member M and microstructure MS on second member M may be in contact each other or may be isolated. Furthermore, in aforesaid embodiment of the invention, Steps S101 to S105 and Steps S106 to S110 are sequential, however if two or more producing apparatus shown in FIG. 2(a) and FIG. 2(b) can be used, these procedures may be done simultaneously.

Also the temperature in the Step S102 and the temperature (transfer temperature) in the case of heating upper die 2 to be higher than glass transition temperature Tg are preferably set to be higher than glass transition temperature Tg and to be not more than Tg+30° C. In case resin materials with he coefficient of elasticity of 1-4 (GPa) at ordinary temperature are used for the first member M and second member M, if the temperature is set to be higher than Tg+300° C., the surface of the member M will be heated excessively and whole material will start to melt, then defects will occur i.e. deformation of total shape of the member M or creating a keloid distortion on the surface. Also, depending on the kind of resin material, their characters may be changed by carbonization. In addition, it is more preferable to set the transferring temperature to be higher than the glass transition temperature Tg and to be not more than Tg+150° C., as the cooling time can be shortened relatively in the subsequent steps (Steps S104 and S109) and sufficient mold release character from the upper die 2 is maintained.

In the present embodiment of the invention, it has only to form the microstructure MS with an aspect ratio that is a half of necessary aspect ratio for using quarter-wave plate. Therefore, production of optical element becomes easy and the defects in forming microstructure are reduced and the yield of production improves.

Further more, by connecting the first member M and the second member M so that the first microstructure MS and the second microstructure MS may face each other, an optical element which is robust against breakage by external force and in which foreign matters hardly adhere can be provided.

Also the present embodiment of the invention does not require such a large die pressure of 3000N described in Japanese Utility Model Application Jitsukai 2002-220241 (JP2002-220241A). Therefore, it has only to modify conventional injection molding machines and the cost of production facility can be reduced, which make it possible to produce large quantities of optical elements in a short period of time. Meanwhile, the thickness of each of the first member and the second member is preferably 0.1-20 mm and more preferably 1-5 mm.

Figure 4:
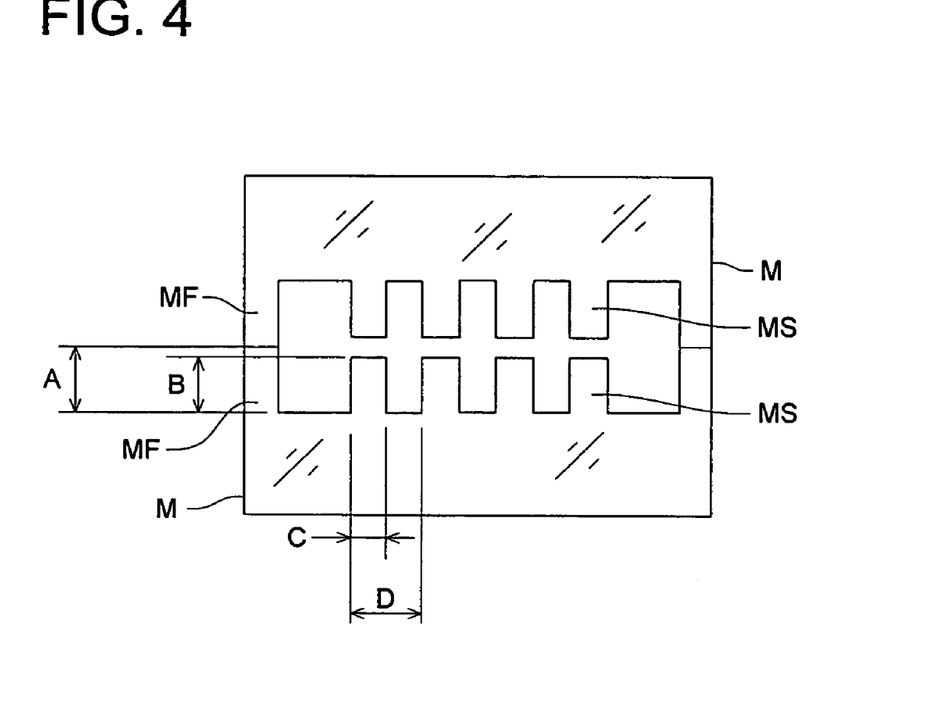
FIG. 4 is a diagram showing a variation of optical. element relating to present embodiment of the invention.

FIG. 4 is a schematic cross-sectional drawing of a variation of the optical element. The optical element shown in FIG. 2(c) contains a ring-shaped member R as a third member however, in the optical element shown by FIG. 4, instead of having ring-shaped member R, flanges MF are made respectively at each peripherals of the first member and the second member. By setting the first member M and the second member M, which are the same in the shape, so that the first microstructures MS and the second microstructure MS may face each other, and opposing surfaces of the flanges MF may be connected, an optical element is obtained. Therefore, the height B of the microstructure MS is preferably not more than the height A of the flange MF. Meanwhile, the aspect ratio of the first microstructure MS in optical element shown by FIG. 4 is represented by B/C and the period is represented by D.

Figure 5:
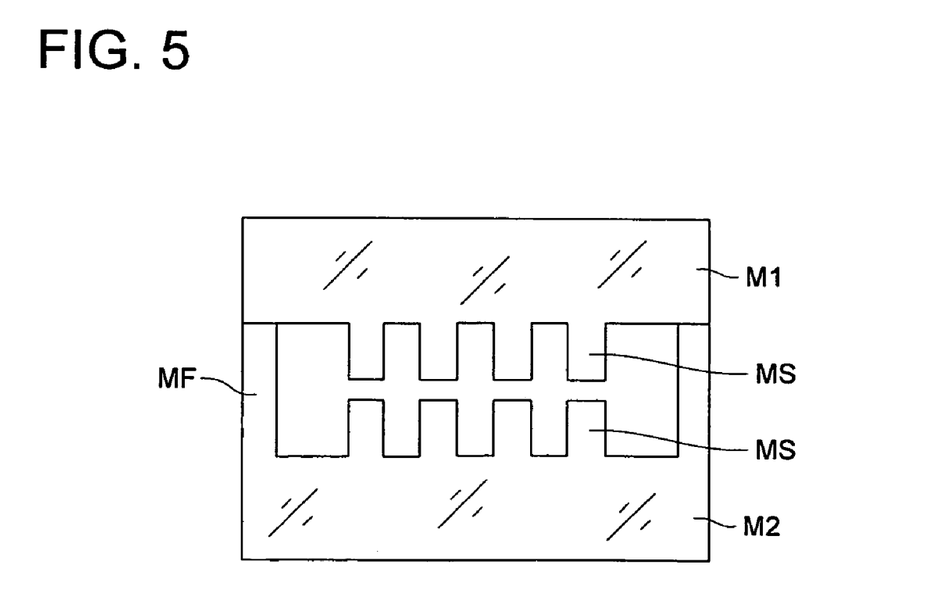
FIG. 5 is a diagram showing a variation of optical element relating to present embodiment of the invention.

FIG. 5 is a schematic cross-sectional drawing of another variation of optical element. In the optical element shown by FIG. 4, the first member M and the second member M are the same in terms of a shape, however in the variation shown in FIG. 5, the first member M1 and the second member M2 are different. The first member M1 has no flanges, yet only the second member M2 forms a flange at its peripheral. By setting the first member M1 and the second member M2 so that the flange MF of the second member M2 may be connected with the first member M1 in a way that the first microstructure MS and the second microstructure MS may face each other, an optical element can be obtained.

Figure 6:
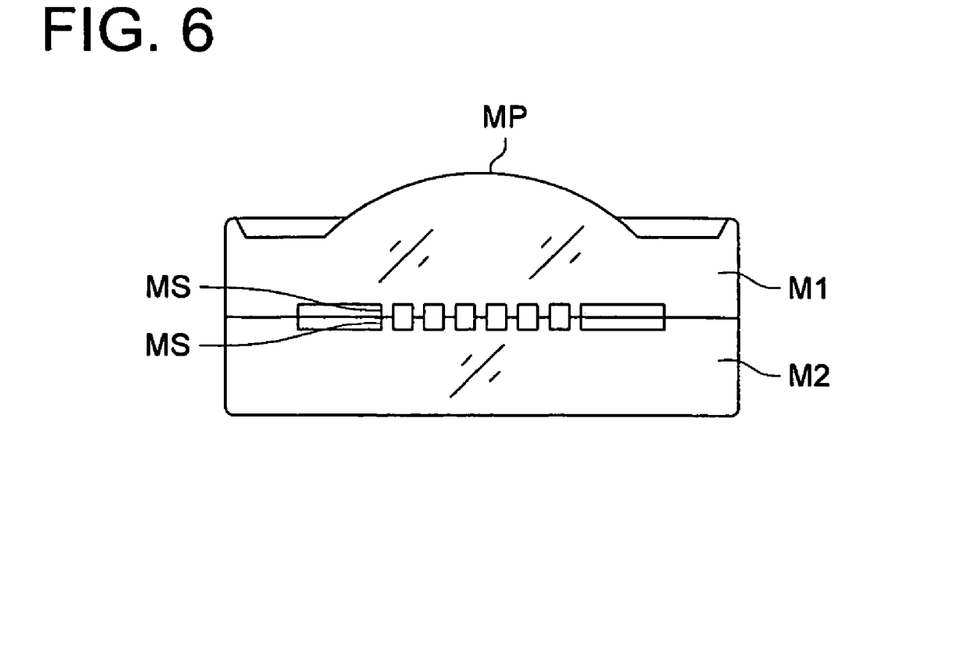
FIG. 6 is a diagram showing a variation of optical element relating to present embodiment of the invention.

FIG. 6 is a schematic cross-sectional drawing of other variation of the optical element. In the optical elements shown by FIG. 4 and FIG. 5, the first member M1 and the second member M2 are plates, however in the variation shown by FIG. 6, the first member M1 is made to be film (in other word sheet). As the elasticity can be given to the first member by making it a film, the surface having microstructure MS of second member M2 can be curved. As deforming second member, by setting the first member M1 and the second member M2 in a way that the first microstructure MS and the second microstructure MS may face each other, an optical element can be obtained.

Figure 7:
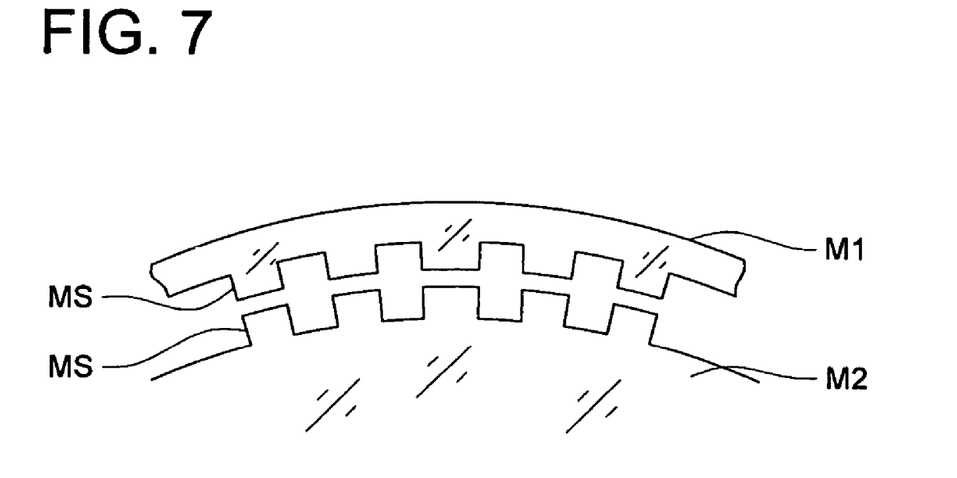
FIG. 7 is a diagram showing a variation of optical element regarding preferred embodiment of the invention.

FIG. 7 is a schematic cross-sectional drawing of other variation of the optical element. In the optical elements shown by FIG. 4 and FIG. 5, the first member M1 has a plane of incident (upper plane in the drawing) in a form of a flat surface however, in the variation shown in FIG. 7, a plane of incident is spherical or aspheric surface in order to give refracting power. By setting the first member M1 and the second member M2 in a way that the first microstructure MS and the second microstructure MS may face each other, an optical element with higher added value can be obtain. Further more, the plane of emergency (lower plane in the drawing) of the second member M2 can also be made spherical or aspheric surface.

Figure 8:
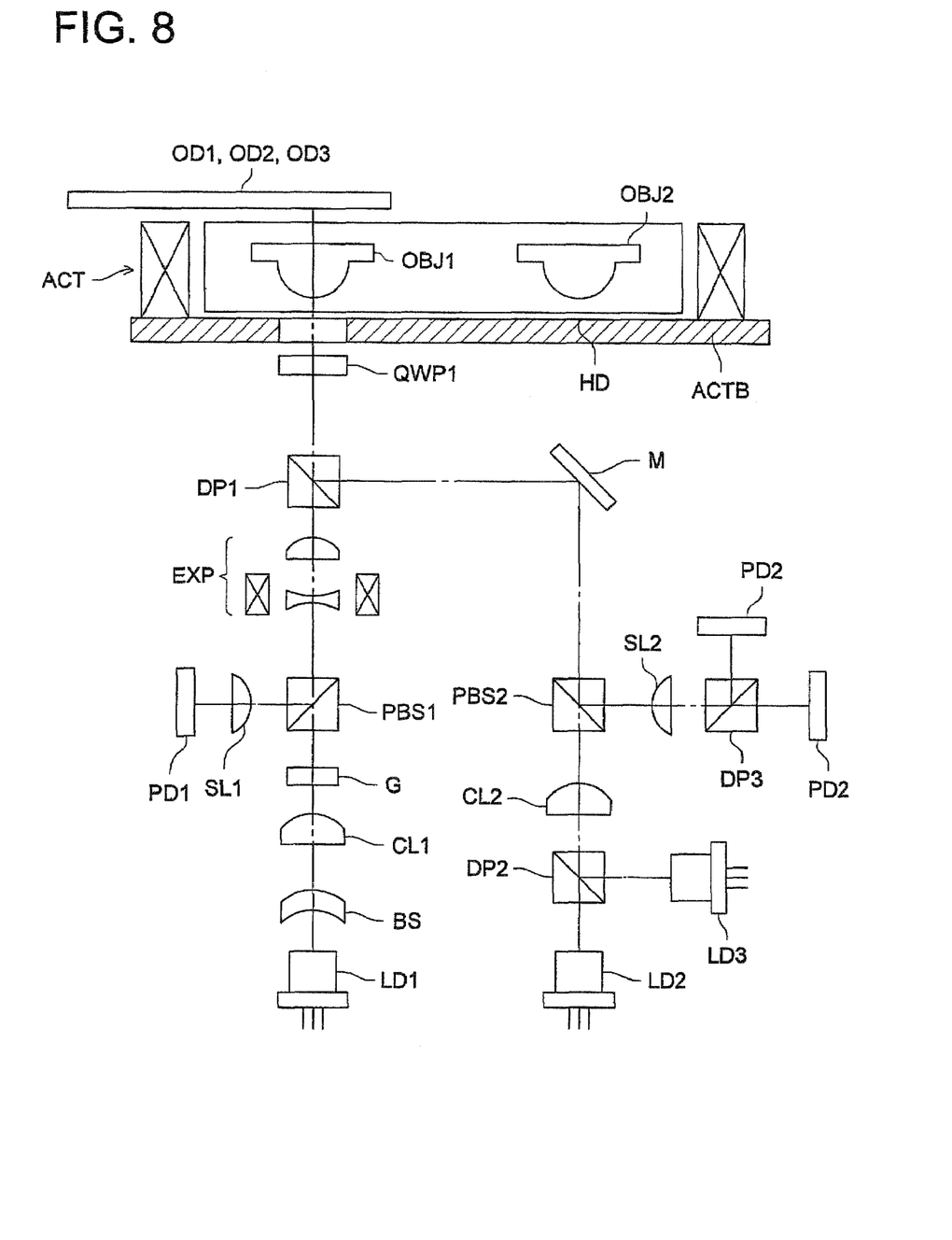
FIG. 8 is a schematic cross-section view of optical pick up device employing quarter wavelength plate representing an optical element of the present embodiment capable of conducting recording and reproducing for all high density DVD (BD or HD, DVD), DVD and CD.

FIG. 8 shows a schematic cross-sectional drawing of an optical pick up device which employing a quarter-wavelength length plate representing an optical element of the present invention that can conduct recording and reproducing of information for all of high density DVD (BD or HD DVD), DVD and CD.

In the present embodiment of the invention, for high density DVD, first object lens OBJ1 is used to converge a laser beam and for DVD and CD, second objective lens OBJ2 is used to converge a laser beam.

When conducting recording and/or reproducing of information for the first optical disc OD1, the lens holder HD is revolved to shift it to the position shown in FIG. 8.

In the FIG. 8, a beam emitted from a first semiconductor laser LD1 (wavelength λ1=405 nm) as a first light source, pass through beam shaper BS to be in terms of a shape of a light flux, and enters first collimator lens CL1 to become a parallel light flux. The light flux emitted from the first collimator lens CL1 passes through diffraction grating G which is an optical means to split the beam from light source into main beam for recording and reproducing and sub beam for detecting tracking error, and further passes through first polarizing beam splitter PBS1 and expander lens EXP. The expander lens EXP has at least one optical element which is movable in the optical axis direction and has a function to change (in this case it expands) the light flux diameter of the parallel light flux. Meanwhile, the expander lens EXP is provided to give spherical surface aberration correcting function and to make it possible to select the information recording surface by moving optical element in the optical axis direction, when high density DVD has 2 layers of information recording surface.

After passing through expander lens EXP, the light flux passes through a first dichroic prism DP1 and a quarter-wave plate QWP, and then is converged by a objective lens OBJ1 maintaining the status of parallel beam, to be converged on an information recording surface through a protective layer (thickness t1=0.1-0.7 mm) of first optical disk OD1 to form a light-converged spot, on the information recoding surface.

Then the light flux reflected and modulated by information pits on information recording surface and reflected passes again through the first objective lens OBJ1, ¼ wavelength plated QWP, first dichroic prism DP1 and expander lens EXP, and is reflected by the first polarizing beam splitter PBS1. Then the light flux passes through first sensor lens SL1, and enters beam receiving plane of first photo-detector PD1. Using this output signal, the read out signal from information recorded in the first optical disk OD1 can be obtained.

Also, by detecting changes of amount of light due to the change of the shape and the position of the spot on the first photo detector PD1, detections of focusing and tracking are done.

Two-dimensional actuator ACT shift the first objective lens OBJ1 together with a lens holder HD based on this detection, so that the light flux from first semiconductor laser LD1 may form images on the information recording surface of the first optical disk OD1.

In case of recording and/or reproducing of information for the second optical disk OD2, the lens holder HD is revolved and shifted from the position shown in FIG. 8.

A light flux emitted from a second semiconductor laser LD2 (wave length λ2=650 nm) pass through second dichroci prism DP2 to become a parallel light flux. And then it passes through second polarizing beam splitter PBS2, then is reflected by mirror M, and passes thorough first dichroic prism DP1 and quarter-wave plate QWP to be converged by second objective lens OBJ2 while keeping its parallel form, and it is converged on an information recording surface, through the protective layer (thickness t2=0.5-0.7 mm) of second optical disk OD2 to form a light converged spot on the information recording surface.

Then the light flux reflected and modulated by information pits on information recording surface passes again through the second objective lens OBJ2, ¼ wavelength plated QWP, first dichroic prism DP1 and is reflected by mirror M and the second polarizing beam splitter PBS2. Then the light flux passes through second sensor lens SL2 and the third dichroic prism, and enters beam receiving plane of second photo-detector PD2. Using this output signal, the read out signal from information recorded in the second optical disk OD2 can be obtained.

Also, by detecting changes of amount of light due to the change of the shape and the position of the spot on the second photo detector PD2, detections of focusing and tracking are done.

Two-dimensional actuator ACT shift the second objective lens OBJ2 together with a lens holder HD based on this detection, so that the light flux from second semiconductor laser LD2 may form images on the information recording surface of the second optical disk OD2.

In case of recording and/or reproducing of information for the third optical disk OD3, the lens holder HD is revolved and shifted from the position shown in FIG. 8. A light flux emitted from a third semiconductor laser LD3 (wave length λ3=785 nm) is reflected by second dichroci prism DP2 and pass through second collimator lens to become parallel light flux. And then passes through second polarizing beam splitter PBS2, then the light flux is reflected by mirror M, and passes thorough first dichroic prism DP1 and quarter-wave plate QWP to be converged by second objective lens OBJ2 while keeping its parallel form, and it is converged on an information recording surface, through the protection layer (thickness t3=1.1-1.3 mm) of third optical disk OD3 to form a light converged spot on the information recording surface.

Then the light flux reflected and modulated by information pits on information recording surface passes again passes through the second objective lens OBJ2, ¼ wavelength plated QWP, first dichroic prism DP1 and is reflected by mirror M and the second polarizing beam splitter PBS2. Then the light flux passes through second sensor lens SL2, and is reflected by the third dichroic prism and enters beam receiving plane of the third photo-detector PD3. Using this output signal, the read out signal from information recorded in the third optical disk OD3 can be obtained.

Also, by detecting changes of amount of light due to the change of the shape and the position of the spot on the third photo detector PD3, detections of focusing and tracking are done.

Two-dimensional actuator ACT shift the second objective lens OBJ2 together with a lens holder HD based on this detection, so that the light flux from third semiconductor laser LD3 may form images on the information recording surface of the third optical disk OD3.

A quarter-wave plate used for optical pick up device in FIG. 8 is made by a manufacturing method show in the flow chart indicated in FIG. 2 and FIG. 3 mentioned above. As a member M, PMMA resin with molecular weight: 700000, glass transition temperature: 100° C., coefficient of elasticity at ordinary temperature (measuring method by JIS K 7162, K7171): 3.3 GPa is used.

In Step S102 and Step S107, heating temperature (transfer temperature) is 140° C. and in Step S104 and Step S109, the surface temperature of the member M after cooling down is 120° C. Connecting in Step S111 is done by sticking the sides of cylinders which are not reference plane of connecting using an adhesive. Thus., a quarter-wave plate with configuration shown in FIG. 4, having the specification of thickness of member M: 2 mm, thickness of element: 4.5 mm, width of line C: 275 nm, period of micro structure D 400 nm, height of microstructure B: 1200 nm (The total height combining upper and lower microstructure is 2400 nm) is obtained.

Figure 9:
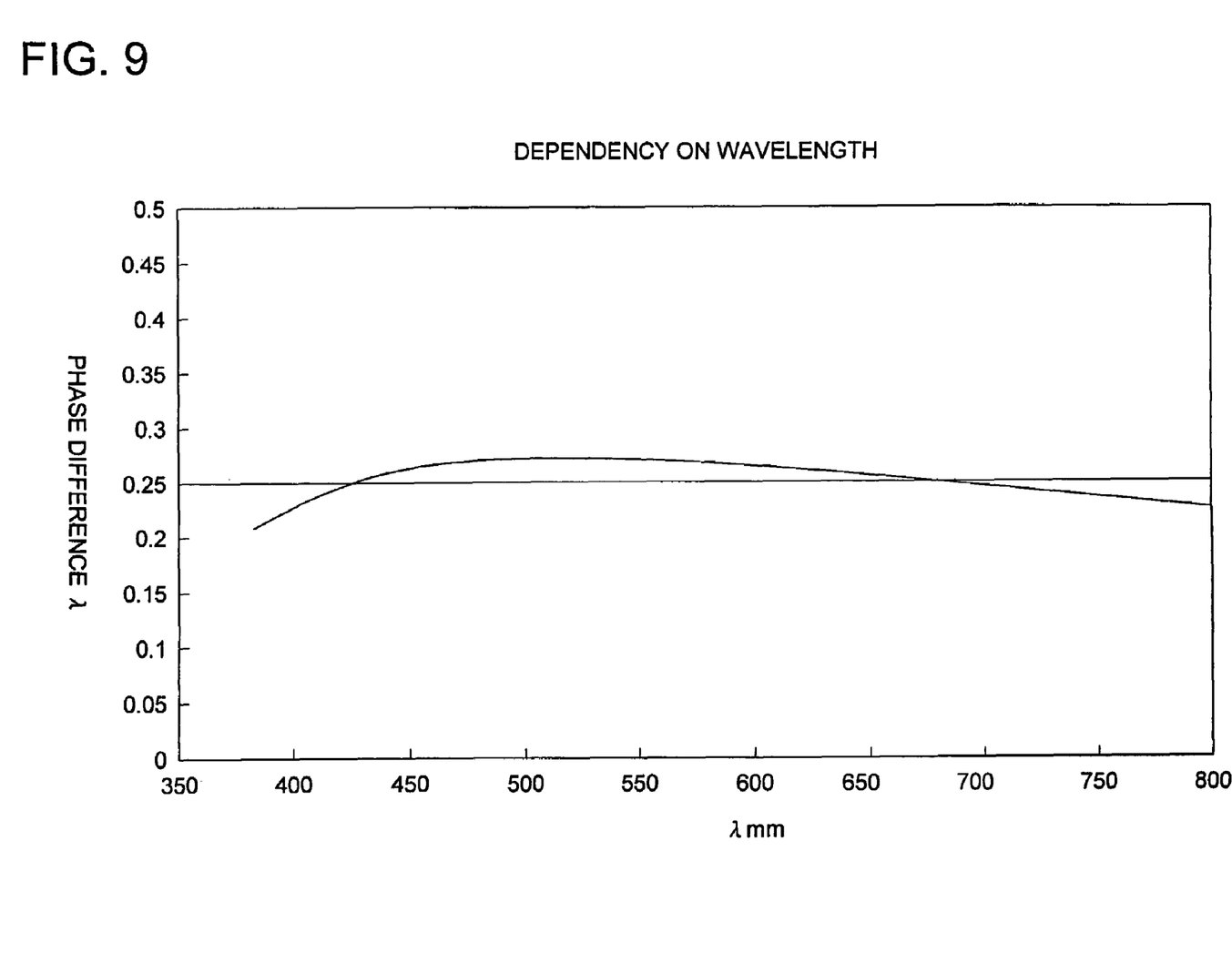
FIG. 9 is a graph showing the character of a wave plate utilizing structural birefringence in the present embodiment of the invention (horizontal axis: wavelength of light transmitted, vertical axis: phase difference given)

FIG. 9 shows the optical character of quarter-wave plate used a optical pick up device in FIG. 8. As FIG. 9 shows, quarter-wave plate of the embodiment of the invention is able to give the phase difference of 0.25±0.05 in the wide wave range of 400-800 nm for TM wave and TE wave a light flux passing through. The wavelength of 3 laser beams used for the optical pick device are λ1=405 nm, λ2=650 nm and λ3=785 nm respectively. By making the period D (=400 nm) of the microstructure in this quarter-wave plate of the embodiment of the invention to be not more than the smallest wave in the above three waves, a quarter-wave plate which can give desired phase difference for these 3 waves was made. Moreover, comparing with the phase difference film made of resin film used as quarter-wave plate in conventional optical pick up devices, it can give phase difference in wider range of wavelength. Also, since the phase difference film does not have sufficient rigidity, it has to be affixed on support materials such as glass, thus the load applied on the drive mechanism of the pick up device is increased due to the increased weight. However, the quarter-wave plate of the invention has an advantage of resolving such problems.

While a quarter-wave plate with configuration shown in FIG. 4 is used here, the same result can be obtained with the configuration in FIG. 5.

Also, the optical elements related to this invention are not limited to quarter-wave plate.

Figure 10:
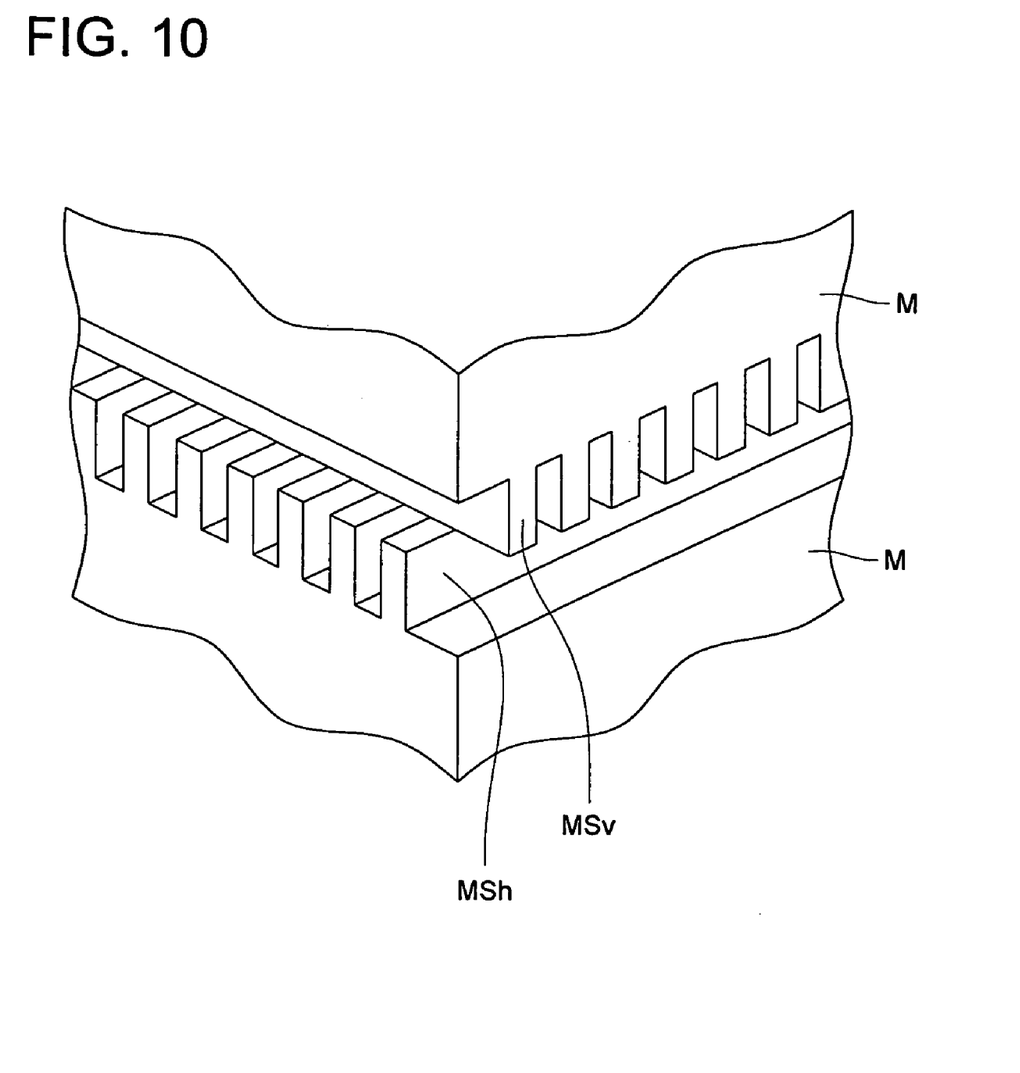
FIG. 10 is a partial perspective view of polarized beam splitter relating to the present embodiment of the invention.

For example, as shown in FIG. 10, a polarizing beam splitter in which connecting a line and space microstructures MSv lined up periodically in first direction on the first member M and a line and space microstructures Msh lined up periodically in second direction on the second member M are stuck each other so that they face each other and the first direction and the second direction may intersect at right angle, may be accepted.

In the production procedure of the present embodiment of the invention, first member with microscopic shape and second member with microscopic shape are connected after they are formed respectively. Owing to this method, highly accurate optical element such as quarter-wave plate can be formed with the first member and the second member having microscopic shapes accurately transferred as mentioned above.

Furthermore, it is preferable that the first member and the second member are connected so that the first microstructure and the second microstructure face each other.

According to the present embodiment of the invention, by connecting the first member and the second member face to face, the optical element in which foreign matters are difficult to adhere and is robust against external force can be supplied.

Also, the first microstructure and the second microstructure are preferred to have an aspect ratio of not less than 1 at the period below the wavelength of the light passing through.

Also, if the first member and the second member have the same shape, the member made from the same production procedure can be connected each other. Therefore, the production becomes easy.

Also, the first member may be different from the second member in terms of a shape. In this case, a sheet member can be used for either the first member or the second member.

Also, the first member and the second member can be connected by a third member. In the example mentioned above, a ring is used as the third member, however the third member to be interposed could have various shapes e.g. square shape surrounding microstructure or independent columnar shape.

It is preferable if the space formed by the first microstructure on the first member and second microstructure on the second member which face each other is airtight, because no dews will be produced from the water in the air. Naturally, the space can be opened to the air.

In the optical element, if either a plane of incident where the light enters for the optical element or a plane of emergency from which the light passing through the optical element emerges is a curved surface (e.g. spherical or aspheric), value added optical element with light-converging function can be provided. Naturally, a flat plane is acceptable.

According to the embodiment of the invention described above, it is possible to provide optical element and its producing method capable of manufacturing an optical element having microstructures with high aspect ratio at low cost in simply way.

While the present invention have been described referring to the embodiment of the invention, it is to be understand that the present invention is not limited to the embodiment of the invention herein and changes and variations may be made.

Although the present invention has been fully described by way of examples with reference to the accompanying drawings, it is to be noted that various changes and modification will be apparent to those skilled in the art. Therefore, unless such changes and modifications depart from the scope of the present invention they should be construed as being included therein.

What is claimed is:

1. An optical phase modulation element comprising:
   a first member having a first microstructure which causes structural birefringence and which has an aspect ratio of not less than 1 and a period that is less than a wavelength of light passing through the optical phase modulation element; and
   a second member having a second microstructure which causes structural birefringence and which has an aspect ratio of not less than 1 and a period that is less than the wavelength of light passing through the optical phase modulation element,
   wherein the first member and the second member are connected so that the first microstructure and the second microstructure face each other.

2. An optical phase modulation element according to claim 1, wherein said period is less than a smallest wavelength among a plurality of different wavelengths of light passing through the optical phase modulation element.

3. An optical phase modulation element according to claim 1, wherein the first microstructure and the second microstructure have a line and space structure.

4. An optical phase modulation element according to claim 1, wherein the first member and the second member have a same shape.

5. An optical phase modulation element according to claim 1, wherein the first member and the second member have a different shape.

6. An optical phase modulation element according to claim 1, wherein one of the first member and the second member comprises a sheet.

7. An optical phase modulation element according to claim 1, wherein a coefficient of elasticity of the first member and the second member is 1-4 (GPa)

8. An optical phase modulation element according to claim 1, wherein a third member joins the first member and the second member.

9. An optical phase modulation element according to claim 1, wherein a space on which the first microstructure and the second microstructure are provided is airtight.

10. An optical phase modulation element according to claim 1, wherein the optical phase modulation element has a plane of incidence where light enters from outside of said optical phase modulation element and a plane of emergence from which light passing through the optical phase modulation element emerges to the outside of the optical phase modulation element,
    wherein one of the plane of incidence and the plane of emergence has a curved surface.

11. An optical phase modulation element according to claim 1, wherein the optical phase modulation element comprises a wave plate.

12. An optical phase modulation element according to claim 1, wherein the optical phase modulation element comprises a polarized beam splitter.

* * * * *